US012572447B2

(12) United States Patent
Kouzmenkov et al.

(10) Patent No.: US 12,572,447 B2
(45) Date of Patent: Mar. 10, 2026

(54) SELECTIVE TRACING OF ENTITIES DURING CODE EXECUTION USING DYNAMIC TRACING CONFIGURATION

(71) Applicant: Arista Networks, Inc., Santa Clara,, CA (US)

(72) Inventors: Arseniy Kouzmenkov, New Westminster (CA); Trevor Siemens, Coquitlam (CA); Mayukh Saubhasik, Richmond (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 347 days.

(21) Appl. No.: 18/145,297

(22) Filed: Dec. 22, 2022

(65) Prior Publication Data

US 2024/0211374 A1 Jun. 27, 2024

(51) Int. Cl.
*G06F 11/362* (2025.01)
*G06F 11/34* (2006.01)
(52) U.S. Cl.
CPC ...... *G06F 11/3636* (2013.01); *G06F 11/3476* (2013.01)
(58) Field of Classification Search
CPC .......................... G06F 11/3636; G06F 11/3476
See application file for complete search history.

(56) References Cited

U.S. PATENT DOCUMENTS

| | | | | |
|---|---|---|---|---|
| 9,934,125 B1 * | 4/2018 | Gomes | ................ | G06F 11/3698 |
| 2014/0215444 A1 * | 7/2014 | Voccio | ................ | G06F 11/3644 |
| | | | | 717/128 |
| 2016/0266998 A1 * | 9/2016 | Gautallin | ............ | G06F 11/3093 |

OTHER PUBLICATIONS

Danny B. Lange et al.; Object-Oriented Program Tracing and Visualization; IEEE; pp. 63-70; retrieved on Sep. 10, 2025 (Year: 1997).*
Stefan Voigt et al.; Object Aware Execution Trace Exploration; IEEE; pp. 201-210; retrieved on Sep. 10, 2025 (Year: 2009).*

* cited by examiner

*Primary Examiner* — S. Sough
*Assistant Examiner* — Cuong V Luu
(74) *Attorney, Agent, or Firm* — Sprinkle IP Law Group

(57) ABSTRACT

Selective tracing using dynamic tracing configuration is presented. According to various embodiments, tracing configuration data specifies entities to be traced through execution of tracing code in code blocks. When a code block is executed to process a particular entity it can be determined if tracing is enabled for that entity using this tracing configuration data. Based on that determination, a global tracing configuration may be configured such that the tracing code included in the code block may, or may not, be executed when processing that entity.

18 Claims, 7 Drawing Sheets

SELECTIVE TRACING OF ENTITIES DURING CODE EXECUTION USING DYNAMIC TRACING CONFIGURATION

BACKGROUND

In computer programming and software development, debugging tools and processes are often deployed to find and mitigate "bugs" or problems within programs, applications, or systems. Much of the debugging process is done in real-time by monitoring the code flow during execution, usually during the development process before such code is deployed. One technique used for monitoring software for debugging is known as "tracing," which involves the specialized use of logging to record information about code execution.

In most cases, trace points are inserted in the code at locations where significant events (or events of interest) occur. These trace points include code which may output an event to a log file (often referred to as a trace log or trace file) in real-time during code execution. These events may identify various information associated with the processing, such as the entity (e.g., item or object) being processed. These events thus help to understand the system behavior for performance tuning, monitoring, troubleshooting problems or other analysis of the code being traced. One of the main advantages for using tracing for debugging (or other) purposes is the dynamic nature of the events being generated (e.g., they are generated during runtime and provide runtime data on code execution). In this manner, performance or other type of useful analysis may be conducted using events from these trace logs.

The use of tracing is, however, not without issues. Oftentimes trace files grow to unmanageable sizes (e.g., they fill up or "overflow" size limits) at which point they usually must be reduced in size or otherwise dealt with (e.g., compressed or rotated). While the trace log is being processed in this manner, it is typically unavailable (e.g., for use by the tracing code). Thus, tracing events occurring at that time may not be stored. Moreover, as the volume of tracing grows, the possibility that the very use of this tracing itself may introduce unwanted effects or errors, or may unintentionally ameliorate certain errors that would otherwise manifest during execution of the code (e.g., timing errors or conditions in the code itself), grows commensurately.

What is desired then, is to improve the implementation of such tracing.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
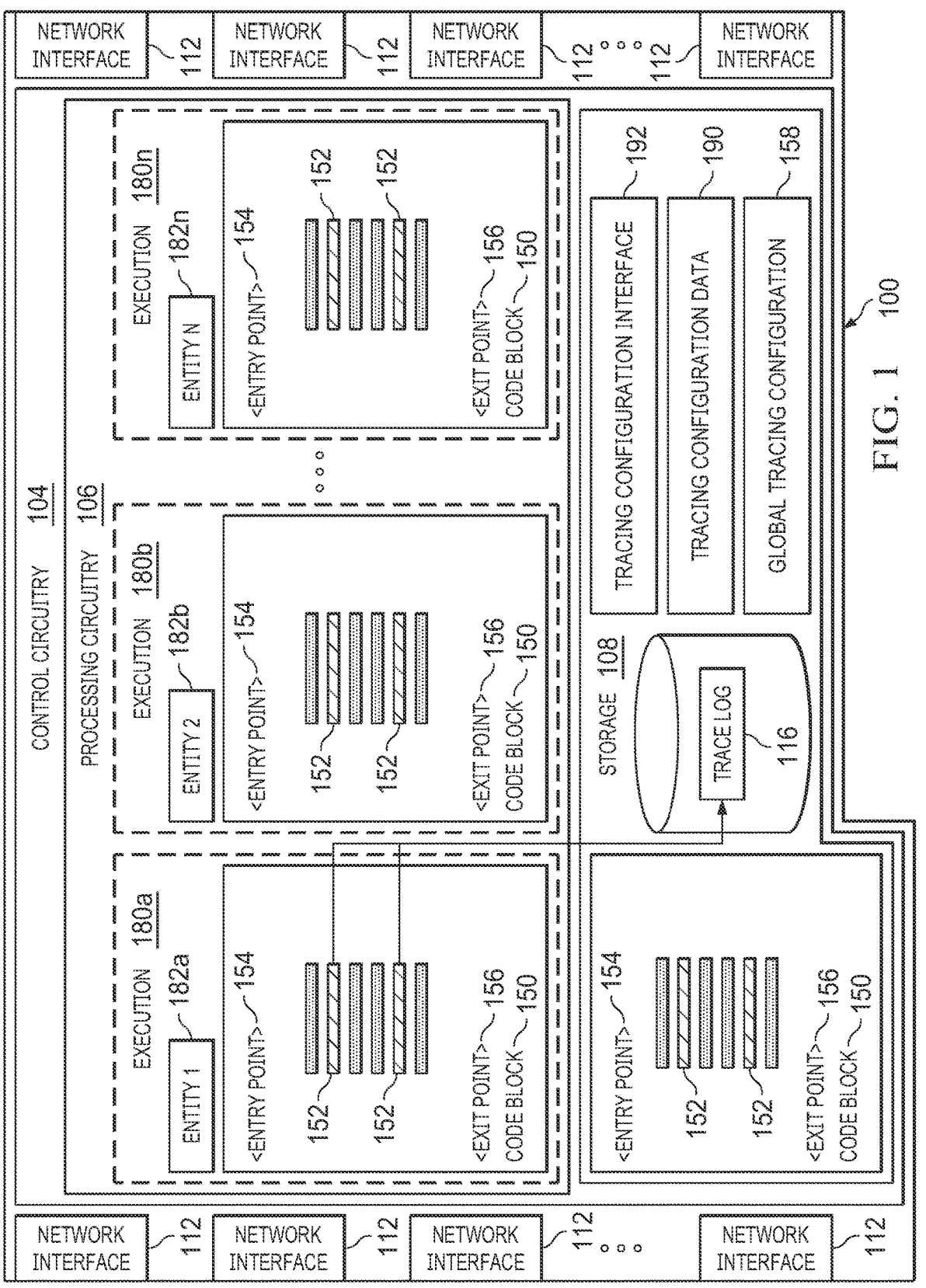
FIG. 1 is a block diagram of an embodiment of a network device for selective tracing.

As discussed, one method of debugging (or otherwise making determinations about the operation of) software code involves the use of logging to record information about code execution. This is known as tracing. Trace points are inserted in the code that it is desired to instrument at locations of interest such that those trace points may output an event to a log file during execution of the instrumented code. These events thus provide a reflection of the dynamic (e.g., runtime) operation of the instrumented code and associated data.

Tracing, however, may itself present certain problems. Trace files may be so large as to be unmanageable, requiring action to be taken on those log files. While these actions are being performed, the trace log is typically unavailable (e.g., for use by the tracing code). Thus, tracing events may not be stored. The use of tracing may also introduce unwanted effects or errors, or may unintentionally ameliorate certain errors that would otherwise manifest during execution of the code.

Problems of this type with tracing are particularly prevalent in certain contexts, such as when tracing is implemented on network devices. Because of the high speeds with which these network devices perform their processing, and the high volume of entities that they process, a large volume of such trace events may be generated when tracing the execution of the code on these network devices, especially in conjunction with tracing code used for packet forwarding on these types of devices.

The large size of trace logs is particularly inimical to their use. In particular, a person accessing such a trace log (e.g., for debugging) usually cares only about a specific entity (or group of entities) being processed. Events associated with other entities in the trace file may be superfluous to their needs and are disregarded. The size of trace logs, and the inclusion of a large number of events from these superfluous entities in such trace logs, thus creates additional problems during the debug process itself. Namely, how can events for entities of interest be easily located and utilized. While trace logs can be filtered at a later point to determine events associated with these entities of interest, this is a time consuming and often error prone process. Moreover, such filtering capabilities still do not solve the problem of gaps in the trace data for such entities of interest caused by overflow of the log files, or other issues discussed above.

What is desired then, is to limit tracing to entities of interest such that events associated with irrelevant (e.g., not of interest) entities can be prevented from being logged at all. Part and parcel with this desire to trace only specific entities is the desire for the ability to specify and implement tracing with respect to these entities at a fine level of granularity with respect to various aspects of such tracing, including what type of tracing gets utilized and with which code tracing gets utilized.

To address these desires, among others, embodiments as disclosed allow the selective tracing of entities during the execution of code using dynamic tracing configuration (i.e., the configuration of the execution of tracing code in code being executed during runtime, at the point the code is actually executed or while the code is being executed). According to various embodiments, code blocks where it is desired to implement tracing may be instrumented with tracing code. A global tracing configuration may indicate whether the tracing code of these code blocks will execute when the instrumented code blocks are executed. For example, if the global tracing configuration indicates that tracing is enabled, the tracing code may log events to the trace log when the code block is executed, while if the global tracing configuration indicates that tracing is disabled, the tracing code may not execute (e.g., may not write events to the trace log when the code block is executed).

Tracing configuration data specifying entities to be traced in accordance with execution of these code blocks can be configured, such as through a command line or other type of interface. Thus, tracing can be enabled for entities of interest by storing tracing configuration data for that entity (e.g., an identifier of the entity itself) in the tracing configuration data. When a code block is executed to process an entity it can be determined if tracing is enabled for that entity by accessing the stored tracing configuration data. Specifically, according to one embodiment, this determination can be made when an entry point of the instrumented code block is reached. For example, a call can be made to enable tracing and identifying the entity. This call may be made, for example, by a constructor for an object scoped to the context of the use of that code block for processing the entity.

If the identified entity is not in the tracing configuration data, no action may be taken. If, however, the entity is included in the tracing configuration data (e.g., has been specified as an entity for which tracing should be enabled), the global tracing configuration may be configured such that when the code block is processing the entity the tracing code included in that code block may be executed (e.g., to output trace events for the entity being processed).

In some embodiments, the configuration of the global tracing configuration may entail a simple enabling of tracing (e.g., if the previous state of the global tracing configuration disabled tracing). The configuration of the global tracing configuration may also be more complex. For example, entity configuration data associated with the entity in the tracing configuration data may specify a type or level of tracing that should be enabled for an entity, or may be associated with a particular domain, such as route processing, forwarding equivalency class (FEC) processing, or network adjacency processing in the context of a network device. Thus, the global tracing configuration may be configured according to the entity configuration data for the entity such that, for example, a tracing level or a tracing facility is enabled in association with execution of the code block for processing that entity, or the tracing is enabled for, or tailored to, a particular domain.

In particular embodiments, a current state of the global tracing configuration may be stored as a previous state before (re)configuring the global tracing configuration. Accordingly, when an exit point of the instrumented code block is reached the previous state of the global tracing configuration may be restored. In one embodiment, when an exit point of the instrumented code is reached a call identifying the entity can be made to disable tracing for the entity. This call can be made, for example, by a destructor for an object scoped to the context of the use of that code block for processing the entity. If the identified entity is not in the tracing configuration data no action may be taken. If, however, the entity is included in the tracing configuration data (e.g., has been specified as an entity for which tracing should be enabled), the previous state of the global tracing configuration may be restored.

Embodiments may thus have the advantage of allowing tracing to be dynamically activated only for desired entities (when those entities are being processed). As an added benefit, the specification of the tracing enabled may be accomplished with a high level of granularity including based on a specific domain, tracing level, or facility. By limiting the activation of tracing to only certain entities or domains of interest, trace files can be limited to tracing events for only those entities of interest, reducing both the size and breadth of the trace file. These reductions, in turn, limit the interruptions to the tracing itself (e.g., caused by the need to deal with overflow trace files), while simultaneously making the trace file easier to utilize by limiting the events in the file to entities of interest, thereby reducing or eliminating the need for a user to sort or filter the trace log.

Moreover, by not having to execute tracing statements or write to the trace file for every entity being processed, the performance of the underlying system may be improved. More specifically, by confining the execution of tracing code to only selected entities the performance of a system executing tracing may be increased, as such tracing statements only execute for those specified entities (i.e., instead of requiring such code to execute for all entities that are processed). In a similar vein, by limiting the execution of tracing to particular entities the impact on the overall performance of the system of the execution of such tracing may also be minimized.

Additionally, by curtailing the execution of tracing code during the execution of the instrumented code the likelihood of introducing additional idiosyncrasies or other problems not endemic to the underlying code (e.g., caused by the repeated execution of tracing code) is reduced. Embodiments may also allow previous states of tracing configurations to be easily saved and restored without any sort of manual intervention, even when multiple instrumented code paths are traversed. As embodiments may also perform such tracing enablement at a global level, embodiments may provide a significant advantage in that selective tracing may be implemented without the retrofitting of tracing code already included in code blocks for such selective tracing. Similarly, new tracing code may be added to code blocks without requiring such tracing code to be specifically adapted to perform such selective tracing.

Looking first at FIG. 1, one embodiment of a computing system adapted for using dynamic tracing configuration for performing selective tracing of entities is depicted. Before describing embodiments further it will be noted that this embodiment, as well as other embodiments depicted herein, are discussed with respect to a computing system operating as a network device, such embodiments are described by way of example and it will be understood that embodiments as described herein are generally applicable to almost any computing device or system without loss of generality.

In the depicted embodiment, then, a computing system may be a network device 100 (e.g., such as a router, switch, server, or any other computing system or device that may be configured to control or process network traffic). The network device 100 may receive data, including packets from hosts (not shown) through network interfaces 112. An I/O path may provide packet data to control circuitry 104, which includes processing circuitry 106 and storage (i.e., memory) 108. Control circuitry 104 may send and receive commands, requests, and other suitable data using the I/O path. The I/O path may connect control circuitry 104 (and specifically processing circuitry 106) to one or more network interfaces 112 to which other devices of a network (e.g., hosts) can be connected. These network interfaces 112 may be any type of network interface, such as an RJ45 ethernet port, a coaxial port, etc.

Control circuitry 104 includes processing circuitry 106 and storage 108. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 106 is distributed across multiple separate processors or processing units, for example, multiple of the same type of processing units (e.g., two INTEL™ CORE i7™ processors) or multiple different processors (e.g., an INTEL™ CORE i5™ processor and an INTEL™ CORE i7™ processor). The circuitry described herein may execute instructions included in software running on one or more general purpose or specialized processors.

Storage 108 may be an electronic storage device that includes volatile random-access memory (RAM) 130, which does not retain its contents when power is turned off, and non-volatile RAM 132, which does retain its contents when power is turned off. As referred to herein, the phrase "electronic storage device" or "storage device" should be understood to mean any device for storing electronic data, computer software, instructions, or firmware, such as RAM, content-addressable memory (CAM), hard drives, optical drives, solid state devices, quantum storage devices, or any other suitable fixed or removable storage devices, or any combination of the same.

Control circuitry 104 thus executes instructions for the implementation of desired functionality of the network device 100. Specifically, code blocks 150 (e.g., stored in storage 108) may be executed by control circuitry 104 (e.g., on processing circuitry 106) to implement such functionality. The term code block, as used herein, will be understood to mean any grouping of instructions (e.g., computer instructions executable by processing circuitry or adapted to configure such processing circuitry), such as functions, modules, procedures, classes, loops, or any other collection or grouping of instructions.

Code blocks 150 may be adapted to perform processing on particular entities (e.g., items, object, values, etc.). In the context of a network device for example, such entities may include (or represent) particular routes, prefixes (e.g., network prefixes), FECs, L2 adjacencies, etc. Code blocks 150 may thus be executed repeatedly by processing circuitry 106 where each instance of execution 180 of the code block 150 may process a particular entity 182 (e.g., entity 182a, 182b, 182n, etc.).

Code block 150 includes one or more trace statements 152 (also referred to as tracing code). These trace statements 152 include code which may output an event to a trace log 116 in real-time during execution 180 of the code block 150. These events may identify various information associated with the execution 180 of the code block 150, such as processing data associated with the entity 182 (e.g., item or object) being processed. Global tracing configuration 158 may indicate whether the tracing code 152 of the code block 150 will execute when the code block 150 is executed 180. In other words, one configuration of global tracing configuration 158 may enable tracing through execution of the tracing code 152 of the code block 150 when the code block 150 is executed and another configuration of global tracing configuration 158 may disable tracing by preventing execution of the tracing code 152 of the code block 150 when the code block 150 executes. Global tracing configuration 158 can be, for instance, a flag or (e.g., global) variable, etc.

Accordingly, if the global tracing configuration 158 indicates that tracing is enabled, the tracing code 152 may log events to the trace log 116 when the code block 150 is executed, while if the global tracing configuration 158 indicates that tracing is disabled the tracing code 152 may not execute when the code block 150 is executed 180.

As discussed, it is advantageous to limit tracing to entities 182 of interest such that when code block 150 is executed 180 for entities 182 of interest, the tracing in statements 152 of the code block 150 are executed and events are logged in tracing file 116 while, conversely, when code block 150 is executed for processing entities 182 that are not of interest the tracing statements 152 of the code block 150 are not executed (or do not otherwise log events to the tracing log 116). In this manner, only events associated with entities 182 of interest may be logged while events associated with those irrelevant (e.g., not of interest) entities 182 can be prevented from being logged at all.

Embodiments as disclosed allow such selective tracing of entities using dynamic configuration of global tracing configuration 158. In particular, tracing configuration data 190 may be stored at the network device 100. This tracing configuration data 190 specifies entities to be traced in accordance with the execution of code. This tracing configuration data 190 may be configured through a tracing configuration interface 192 which may be, for example, a command line, graphical user interface, or other type of interface through which entities 182 to trace may be specified.

Accordingly, tracing can be enabled for entities 182 of interest by storing tracing configuration data for that entity (e.g., an identifier of the entity itself) in the tracing configuration data 190. When the code block 150 is executed 180 to process an entity 182 it can be determined if tracing is enabled for that entity 182 by accessing the stored tracing configuration data 190. According to one embodiment, this determination can be made when an entry point 154 of the instrumented code block is reached during execution 180. For example, a call can be made to enable tracing and identifying the entity being processed by the code block 150 during that instance of execution 180.

If the entity 182 is not identified in the tracing configuration data 190 no action may be taken. If, however, the entity 182 is identified in the tracing configuration data 190 (e.g., has been specified as an entity 182 for which tracing should be enabled), the global tracing configuration 158 may be configured such that when the code block 150 is processing the entity 182 during that instance of execution 180 the tracing code 152 included in that code block may be executed (e.g., to output trace events for the entity 182 being processed to the trace log 116).

When an exit point 156 of the instrumented code block 150 is reached during execution 180 of the code block 150 in association with a particular entity 182, the previous state of the global tracing configuration 158 may be restored (if needed). In one embodiment, when an exit point 156 of the instrumented code block 150 is reached, a call identifying the entity can be made to disable tracing for the entity. More particularly, if the identified entity 182 is not in the tracing configuration data 190, no action may be taken while if the identified entity 182 is in the tracing configuration data 190 (e.g., has been specified as an entity for which tracing should be enabled), a previous global tracing configuration may be obtained such that the global tracing configuration 158 may be restored to this previous configuration. If the identified entity is not in the tracing configuration data no action may be taken.

To illustrate for the purpose of an example, assume that tracing configuration data 190 indicates tracing is enabled for entity 182*a* while there is no entry for entity 182*b* in tracing configuration data 190 (i.e., there is no data indicating tracing is to be enabled for entity 182*b*). Here, when code block 150 is executed 180*a* on entity 182*a*, when entry point 154 is encountered during execution, a call can be made to enable tracing and identifying the entity 182*a* being processed by the code block 150 during that instance of execution 180*a*. It can then be determined that tracing is enabled for entity 182*a* by accessing the stored tracing configuration data 190. Accordingly, the global tracing configuration 158 data may be configured to indicate that tracing is enabled. Thus, tracing statements 152 of code block 150 may be executed to log events to trace log 116 during execution 180*a* of code block 150 on entity 182*a* based on the configured state of the global tracing configuration 158.

Similarly, when exit point 156 is encountered during execution, a call can be made to disable tracing and identifying the entity 182*a* being processed by the code block 150 during that instance of execution 180*a*. It can be determined that tracing was enabled for entity 182*a* by accessing the stored tracing configuration data 190. Accordingly, the global tracing configuration 158 data may be configured to indicate that tracing is enabled. The previous state of global tracing configuration can then be obtained and the global tracing configuration 158 restored to this previous configuration.

Conversely, when code block 150 is executed 180*b* on entity 182*b*, when entry point 154 is encountered during execution, a call can be made to enable tracing and identifying the entity 182*b* being processed by the code block 150 during that instance of execution 180*b*. In this case, when it is determined that tracing is not enabled for entity 182*b* by accessing the stored tracing configuration data 190 no action may be taken (e.g., the call may return). Tracing statements 152 of code block 150 may thus not be executed to log events to trace log 116 during execution 180*b* of code block 150 on entity 182*b* based on the state of the global tracing configuration 158. In other words, tracing statements 152 may (or may not) execute based on the (e.g., unchanged) state of global tracing configuration 158.

When exit point 156 is encountered during execution 180*b*, a call is made to disable tracing and identifying the entity 182*b* being processed by the code block 150 during that instance of execution 180*b*. As tracing was not enabled for entity 182*b* as indicated in the stored tracing configuration data 190, no action may be taken. As can be seen, in this manner embodiments may allow tracing to be dynamically activated only for desired entities (when those entities are being processed). By limiting the activation of tracing to only certain entities or domains of interest, trace file 116 can be limited to tracing events for only those entities 182 of interest, reducing both the size and breadth of the trace file 116. As may be realized, while embodiments may be utilized with almost any type of computing systems desired, certain embodiments may be especially suited to event driven systems, whereby the entry points and exit points of code for the processing of events in these systems are readily defined.

Figure 2A:
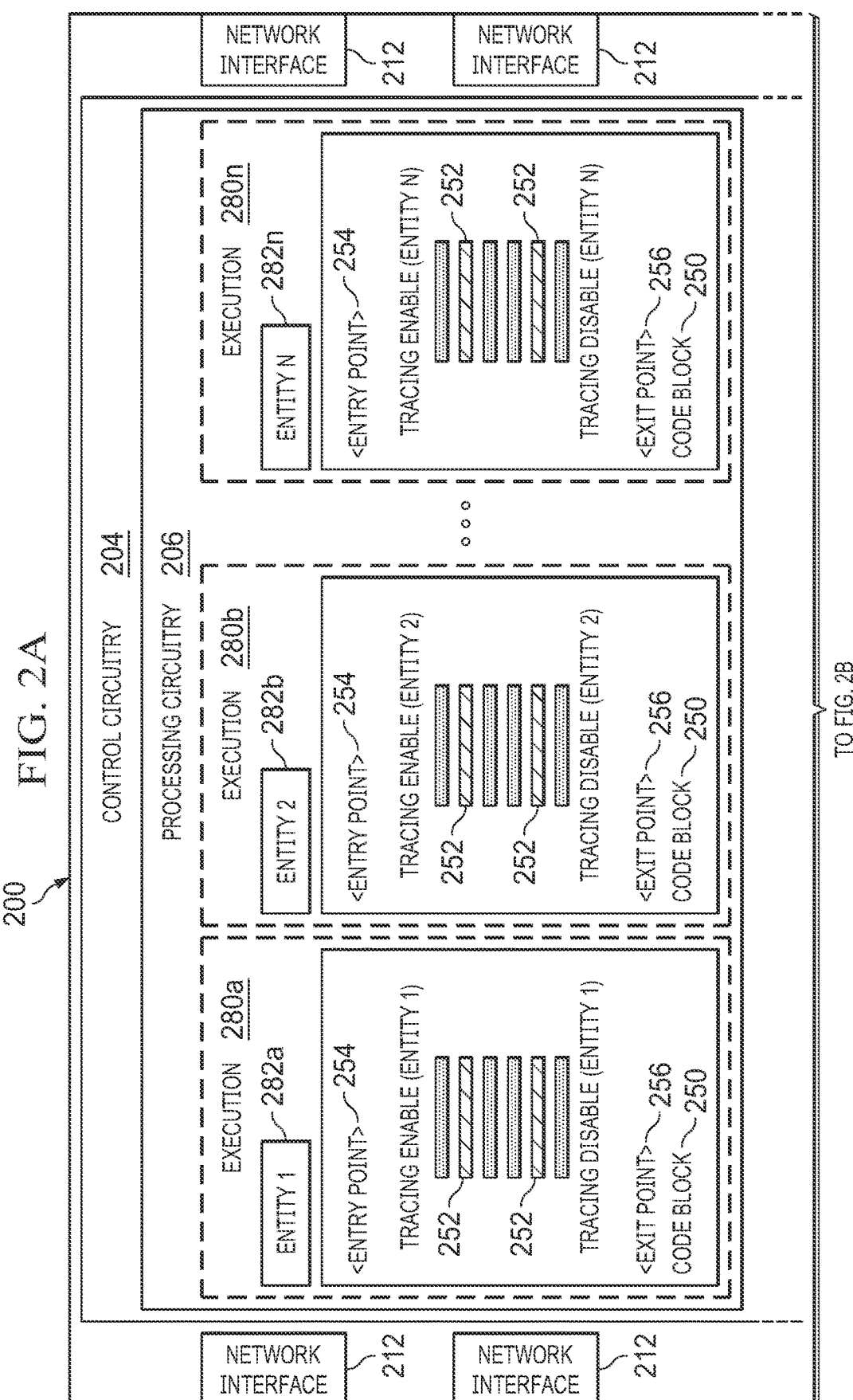
FIGS. 2A and 2B are a block diagram of an embodiment of a network device for selective tracing.
Figure 2B:
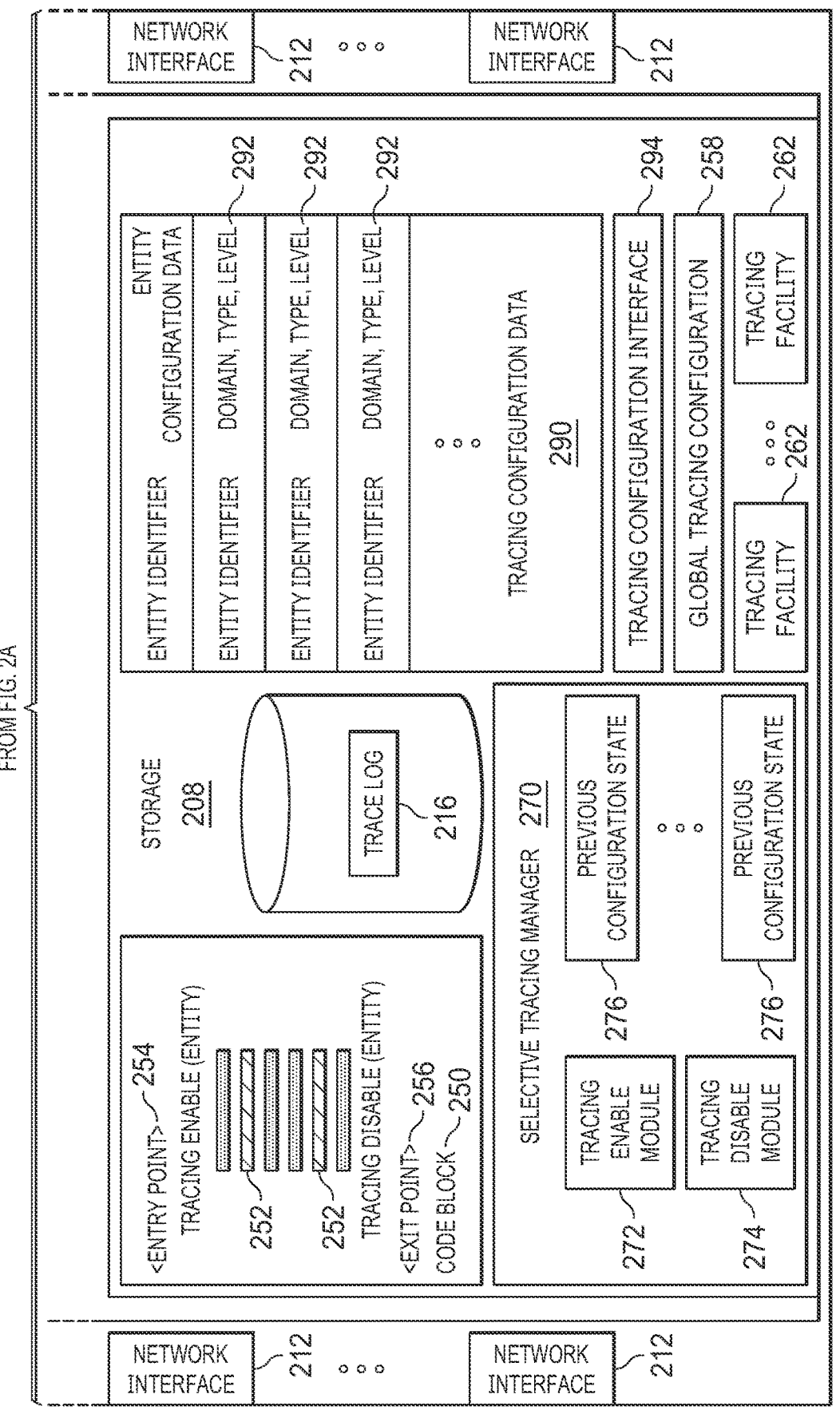

To facilitate the selective enabling and disabling of tracing, embodiments may utilize a selective tracing manager to implement the dynamic configuration of the global tracing configuration during execution of code blocks. Moving to FIGS. 2A and 2B then, one embodiment of a computing system including such a selective tracing manager is depicted. Such a computing system may be a network device

200 (e.g., such as a router, switch, server, or any other computing system or device) configured to control or process network traffic received through network interface 212. Again, as discussed, control circuitry 204 of the network device 200 executes (e.g., on processor circuitry 206) code blocks 250 in storage 208 for the implementation of the functionality of the network device 200, where those code blocks 250 may be executed (e.g., by processing circuitry 206) to perform processing on particular entities (such as routes, prefixes, FECs, L2 adjacencies, etc.) such that each instance of execution 280 of the code block 250 may process a particular entity 282 (e.g., a first execution 280*a* of code block 250 processes a first entity 282*a*, a second execution 280*b* process a second entity 282*b*, a third execution 280*n* process a second 282*n*, etc.).

Code block 250 includes one or more trace statements 252 to output events to trace log 216 in real-time during execution 280 of the code block 250. Trace facilities 262 may be utilized in association with these trace statements 252 to control which of these trace statements 252 execute, or how or when such trace statements 252 execute. These trace facilities 262 may, for example, be associated with a particular domain (e.g., such as route processing, FEC processing, or network adjacency processing) or define a type or level of tracing that should be enabled. Global tracing configuration 258 may thus define a configuration for one or more of trace facilities 262 such that a tracing facility 262 is enabled or disabled for particular domains, or that a particular type or level of tracing is enabled (or disabled) for one or more of the trace facilities 262.

Tracing configuration data 290 stored at the network device 200 may thus include an entry 292 associated with each entity 282 for which tracing is to be enabled. This entry 292 may include an identifier for the entity (e.g., the inclusion of an entry 292 including an entity identifier for an entity 282 may indicate that tracing should be enabled for that entity). Additionally, an entry 292 associated with an entity 282 may include entity configuration data such as an identifier of one or more domains associated with the entity for which tracing should be enabled, or a type or level of tracing that should be enabled for the entity 282 identified by the entity identifier of the entry 292. This tracing configuration data 290 (e.g., the identifier of an entity or any associated entity configuration data) may be configured through a tracing configuration interface 294 which may be, for example, a command line, graphical user interface, or other type of interface through which entities 282 to trace and their associated configuration data may be specified. Other methods of determining such configuration data 290 are also contemplated herein, including making such determinations based on specified or defined tracing configurations in association with an entity 282, type of entity 282, grouping of entities 282, etc.

To implement selective tracing of those entities 282, a selective tracing manager 270 may be utilized. Selective tracing manager 270 includes a tracing enable module 272 adapted to determine whether tracing has been enabled for an entity by accessing tracing configuration data 290, determining any associated entity tracing configuration data associated with an entity, saving a current configuration of the tracing configuration data 290 as a previous configuration state 276, and configuring the global tracing configuration 258 according to if tracing has been enabled for the entity and any associated entity tracing configuration data for that entity. Similarly, selective tracing manager 270 includes tracing disable module 274 adapted to determine whether tracing has been enabled for an entity 282 by accessing tracing configuration data 290, obtaining a (e.g., most recently saved) previous configuration state 276 when tracing was enabled for an entity, and restoring the global tracing configuration 258 to the obtained previous configuration state 276.

In these types of embodiments, code block 250 may include a call to (or otherwise include code to cause a call to be made) to tracing enable module 272 of selective tracing manager 270 specifying an entity 282 being processed at (or after) entry point 254 of the code block 250. Likewise, before the exit point 256 of the code block 250 the code block may include a call to (or otherwise include code to cause a call to be made) to tracing disable module 274. Consequently, during execution 280 of code block 250 to process an entity 282 when (or after) the entry point 254 of the instrumented code block is reached, the code block 250 may call (or cause to be called) the tracing enable module 272 of selective tracing manager 270 with an identifier of the entity being processed during that instance (e.g., 280a, 280b, 280n, etc.) of execution 280. In response to this call, tracing enable module 272 can determine if tracing is enabled for that entity 282 by accessing the stored tracing configuration data 290 to determine if there is an entry 292 for the identified entity 282. Additionally, if there is an entry 292 for that entity 282 any associated entity configuration data for that entity 282 may also be determined.

If the identified entity 282 is not in the tracing configuration data 290, no action may be taken by tracing enable module 272. If, however, the entity 282 is included in the tracing configuration data 290 (e.g., there is an entry 292 in the tracing configuration data 290), the tracing enable module 272 may obtain the current state of the global tracing configuration 258 and store that obtained state as a previous configuration state 276. In one embodiment, multiple previous configuration states 276 may be stored as for example, as a stack or (e.g., last in, first out) queue or the like.

Tracing enable module 272 can then configure global tracing configuration 258 to enable tracing for the entity such that when the code block 250 is processing the entity 282 during that instance of execution 280, the tracing code 252 included in that code block 250 may be executed (or executed in a particular manner). Additionally, tracing enable module 272 can configure global tracing configuration 258 according to any entity configuration data associated with the entity 282 in the tracing configuration data 290 (e.g., that specifies a type or level of tracing that should be enabled for an entity, or may be associated with a particular domain). Thus, the global tracing configuration 258 may be configured according to the entity configuration data for the entity 282 such that, for example, a tracing level or a tracing facility 262 is enabled in association with execution 280 of the code block 250 for processing that entity 282, such tracing may be configured for specific domains.

At, or before, exit point 256 of the code block 250 is reached during execution 280, the code block 250 may call (or cause to be called) the tracing disable module 274 of selective tracing manager 270 with an identifier of the entity being processed during that instance (e.g., execution instance 280a, 280b, 280n, etc.) of execution. In response to this call, tracing disable module 274 can determine if tracing is enabled for that entity 282 by accessing the stored tracing configuration data 290 to determine if there is an entry 292 for the identified entity 282. If the identified entity 282 is not in the tracing configuration data 290 no action may be taken by tracing disable module 274. If, however, the entity 282 is included in the tracing configuration data 290 (e.g., there is an entry 292 in the tracing configuration data 290), the tracing disable module 274 may obtain a (e.g., most recently saved) previous configuration state 276, and restore the global tracing configuration 258 to the obtained previous configuration state 276.

As may be realized from a review of the described embodiments, in certain cases a configuration of the global tracing configuration may be scoped to the execution of a code block for processing a particular entity. Accordingly, some embodiments may utilize an object scoped to the execution of a code block to implement the dynamic configuration of the global tracing configuration during execution of such code blocks. Here, the configuring of a global tracing configuration to enable tracing may be done in response to the instantiation of the object or in response to the association of the object with a defined scope, such as by a constructor of an object or another scope-entry function. Conversely, restoring a previous state of the global configuration may be initiated by a destructor or other scope-exit function associated with the object.

Figure 3A:
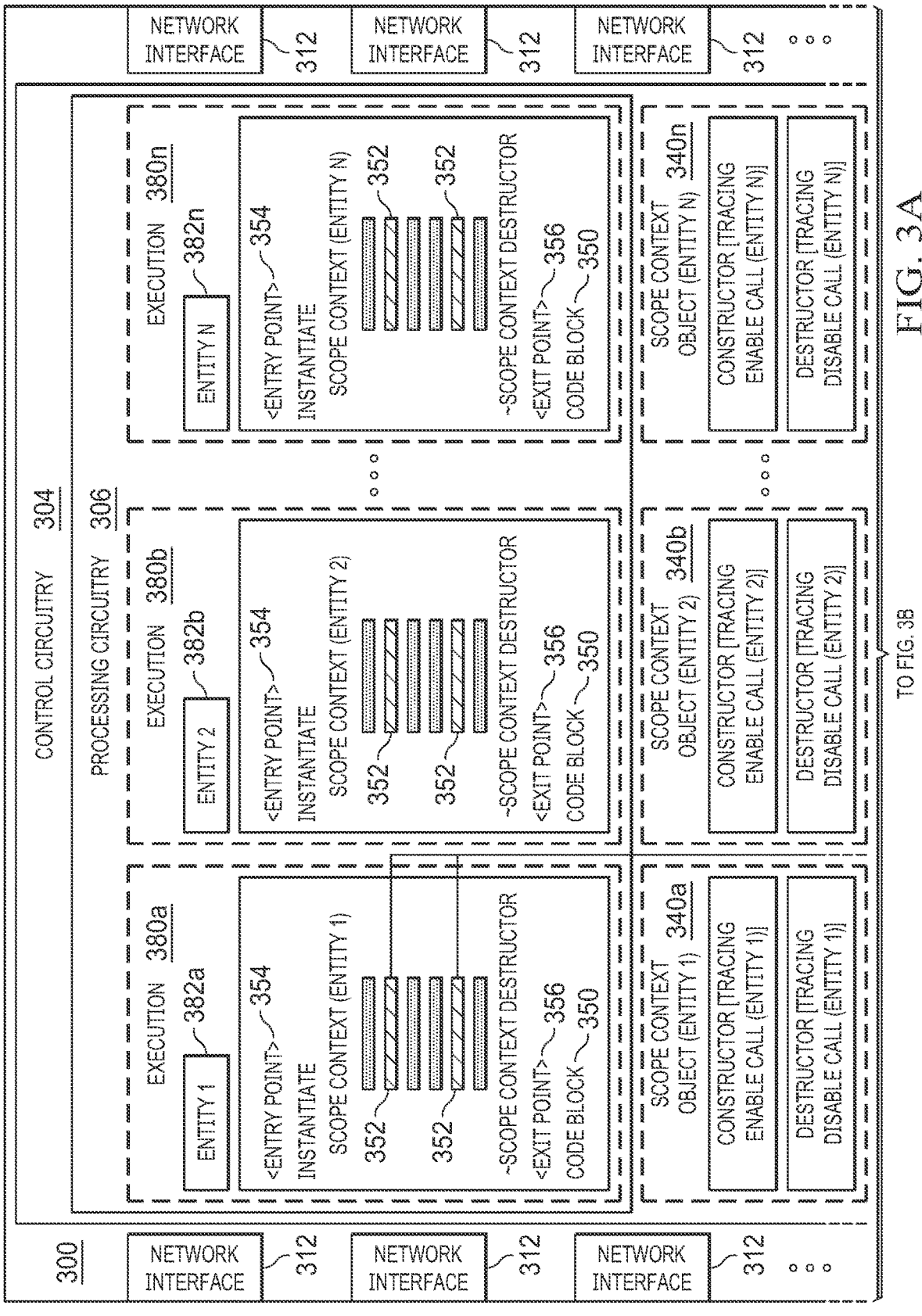
FIGS. 3A and 3B are a block diagram of an embodiment of a network device for selective tracing.
Figure 3B:
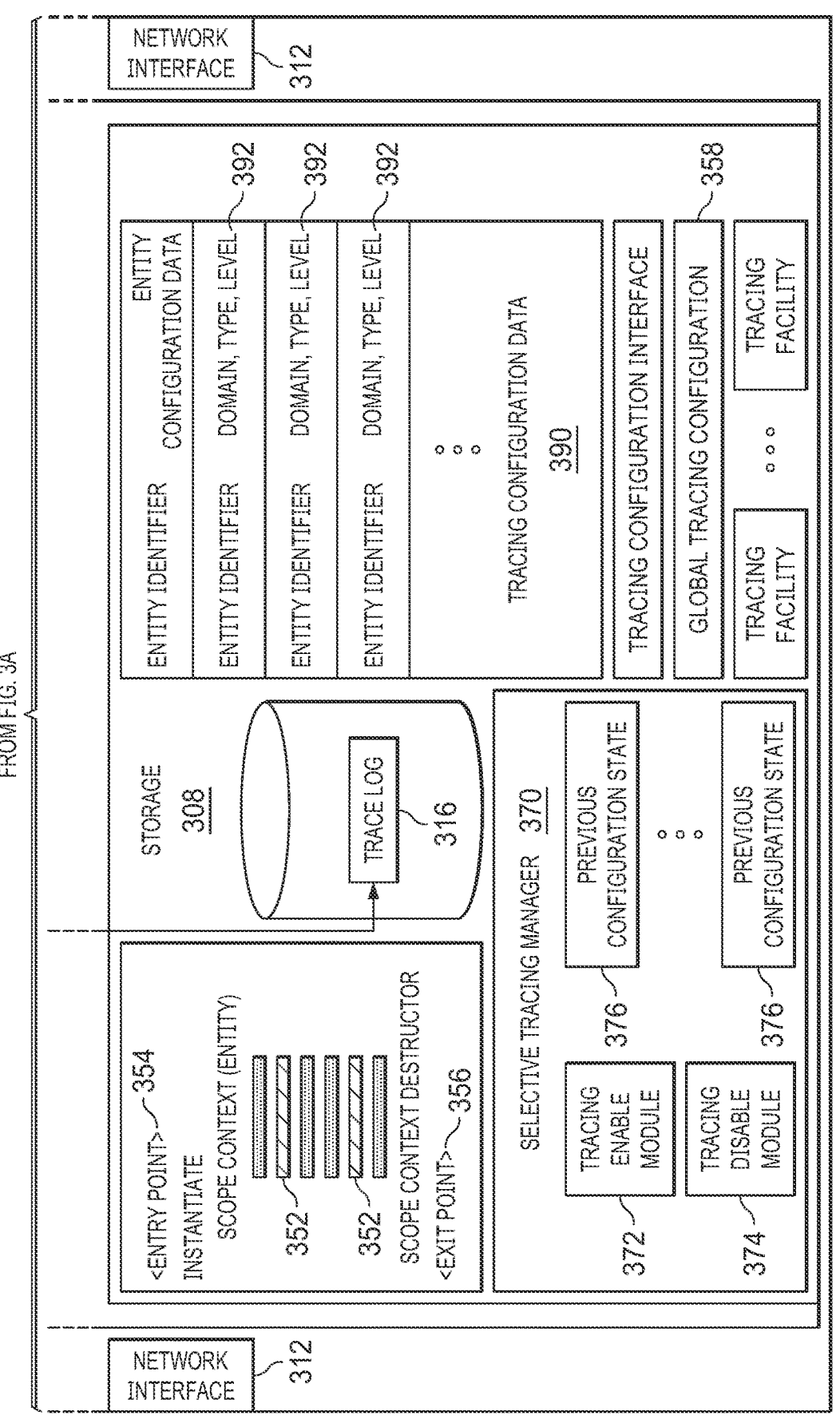

Turning to FIGS. 3A and 3B, one embodiment of a network device 300 for implementing selective tracing utilizing an object scoped to the execution of a code block is depicted. In this embodiment, a scope context object 340 may be defined where that scope context object 340 may be associated with a constructor adapted to call tracing enable module 372 of selective tracing manager 370 and a destructor adapted to call tracing disable module 374 of selective tracing manager 370.

In these embodiments, code block 350 may include code to instantiate an instance of the scope context object (e.g., 340a, 340b, 340n) at (or after) entry point 354 of the code block 350. The instantiation of the scope context object 340 may specify the entity being processed by the code block 350 during that execution 380 (e.g., 380a, 380b, 380n). Conversely, before the exit point 356 of the code block 350 the code block may include a destructor for the scope context object 340.

Thus, during execution 380 of code block 350 to process an entity 382 (e.g., 382a, 283b, 382n) when (or after) the entry point 354 of the instrumented code block is reached, the code block 350 may instantiate an instance of the scope context object 340 (e.g., scope context object 340a, 340b, 340n, etc.). This instance of the scope context object 340 is thus scoped to (e.g., inherits) the same context as the execution of the code block 350.

The instantiation of the scope context object 340 may thus cause the constructor (or another type of scope-entry function) of the scope context object 340 to be invoked on the (e.g., identifier of the) entity 382 being processed in that instance of the execution 380. The constructor of the instance of the scope context object 340 may then call (or cause to be called) the tracing enable module 372 of selective tracing manager 370 with an identifier of the entity being processed during that instance (e.g., 380a, 380b, 380n) of execution 380. In response to this call, tracing enable module 372 can determine if tracing is enabled for that entity 382, and save a previous configuration state 376 or configure global tracing configuration 358 as previously discussed.

Similarly, at or before exit point 356 of the code block 350 is reached during execution 380, the code block 350 may call (or cause to be called) the destructor of the instance of the scope context object 340 created during execution 380 of that code block 350. The destructor of that instance of the scope context object 340 may call the tracing disable module 374 of selective tracing manager 370 with an identifier of the entity 382 being processed during that instance (e.g., 380a, 380*b*, 380*n*) of execution. In response to this call, tracing disable module 374 can determine if tracing is enabled for that entity 382 and restore a previous configuration state 376 to global tracing configuration 358 as previously discussed.

To illustrate for the purpose of an example, assume that tracing configuration data 390 indicates tracing is enabled for entity 382*a* while there is no entry 392 for entity 382*b* in tracing configuration data 390 (i.e., there is no data indicating tracing is to be enabled for entity 382*b*). Here, when code block 350 is executed 380*a* on entity 382*a*, when entry point 354 is encountered during execution a scope context object 340*a* (e.g., scoped to the context of execution 380*a* of code block 350) may be instantiated causing the constructor of the scope context object 340*a* to be called with an identifier of entity 382*a*. The constructor of the scope context object 340*a* may then call tracing enable module 372 of the selective tracing manager 370 with an identifier of entity 382*a*. Tracing enable module 372 can determine that tracing is enabled for entity 382*a* by accessing the stored tracing configuration data 390. Accordingly, the current global tracing configuration 358 may be saved as a previous configuration state 376 and the global tracing configuration 358 configured to indicate that tracing is enabled. Thus, tracing statements 352 of code block 350 may be executed to log events to trace log 316 during execution 380*a* of code block 350 on entity 382*a* based on the configured state of the global tracing configuration 358.

Similarly, when (or before) exit point 356 of code block 350 is reached during execution 380*a* of that code block 350 for entity 382*a*, the destructor (or another type of scope-exit function) of the scope context object 340*a* is called. The destructor of the scope context object 340*a* may then call tracing disable module 374 of the selective tracing manager 370 with an identifier of entity 382*a*. Tracing disable module 374 can then determine that tracing is enabled for entity 382*a*. A previous state 376 of global tracing configuration can then be obtained and the global tracing configuration 358 restored to this previous configuration.

When code block 350 is executed 380*b* on entity 382*b*, when entry point 354 is encountered during execution a scope context object 340*b* (e.g., scoped to the context of execution 380*b* of code block 350) may be instantiated causing the constructor of the scope context object 340*b* to be called with an identifier of entity 382*b*. The constructor of the scope context object 340*b* may then call tracing enable module 372 of the selective tracing manager 370 with an identifier of entity 382*b*. In this case, tracing enable module 372 may determine that tracing is not enabled for entity 382*b* by accessing the stored tracing configuration data 390 and no action may be taken (e.g., the call may return). Tracing statements 352 of code block 350 may thus not be executed to log events to trace log 316 during execution 380*b* of code block 350 on entity 382*b* based on the state of the global tracing configuration 358. In other words, tracing statements 352 may (or may not) execute based on the (e.g., unchanged) state of global tracing configuration 358.

When exit point 356 is reached during execution 380*b* of that code block 350 for entity 382*b*, the destructor of the scope context object 340*b* is called. The destructor of the scope context object 340*b* may then call tracing disable module 374 of the selective tracing manager 370 with an identifier of entity 382*b*. As tracing was not enabled for entity 382*b* as indicated in the stored tracing configuration data 390 tracing disable module 374 may take no action. In this way, embodiments may utilize an object scoped to each individual execution of a code block to dynamically configure tracing only for desired entities (e.g., when those entities are being processed).

Figure 4A:
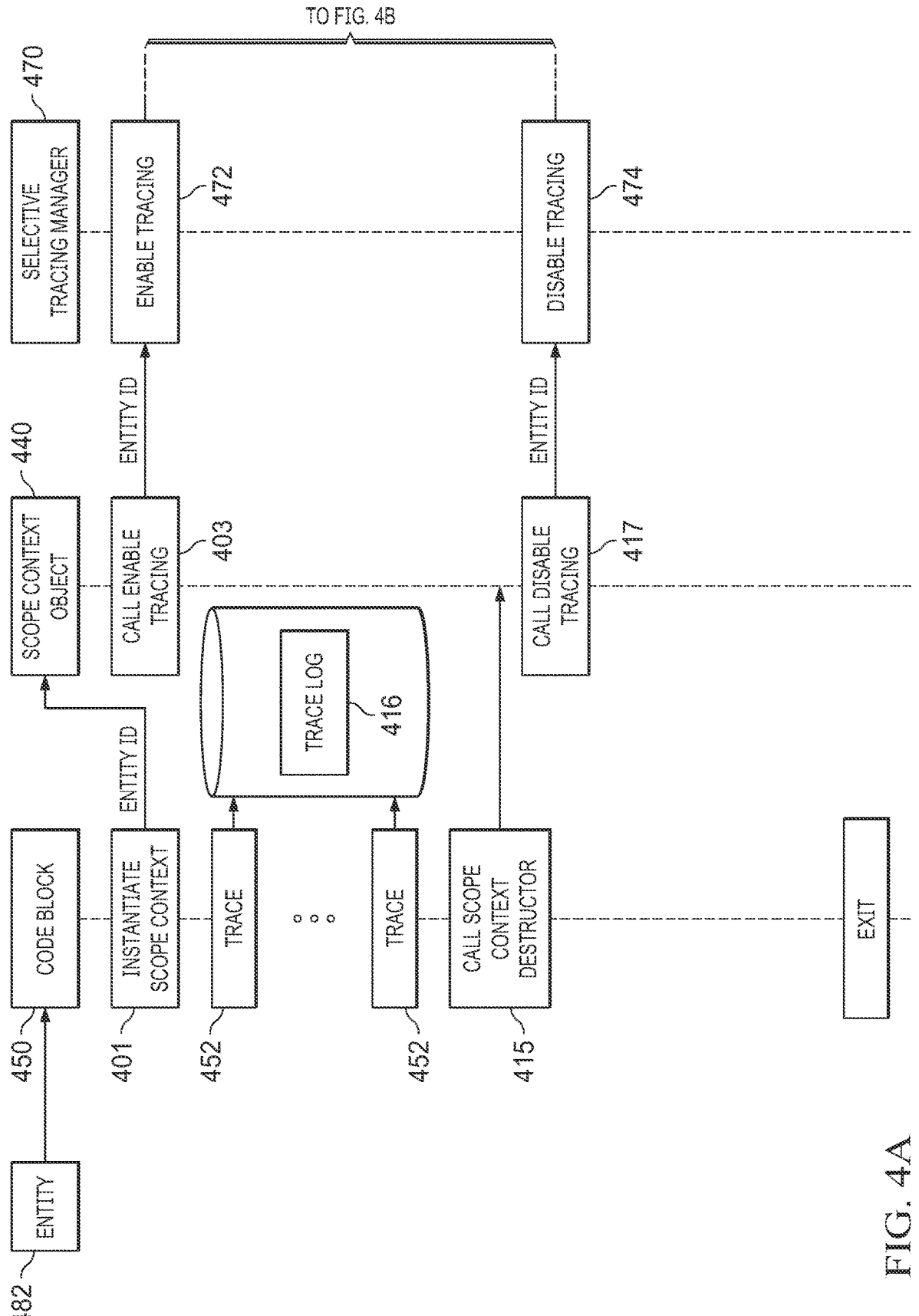
FIGS. 4A and 4B are a flow diagram of an embodiment of a method for selective tracing using dynamic configuration.
Figure 4B:
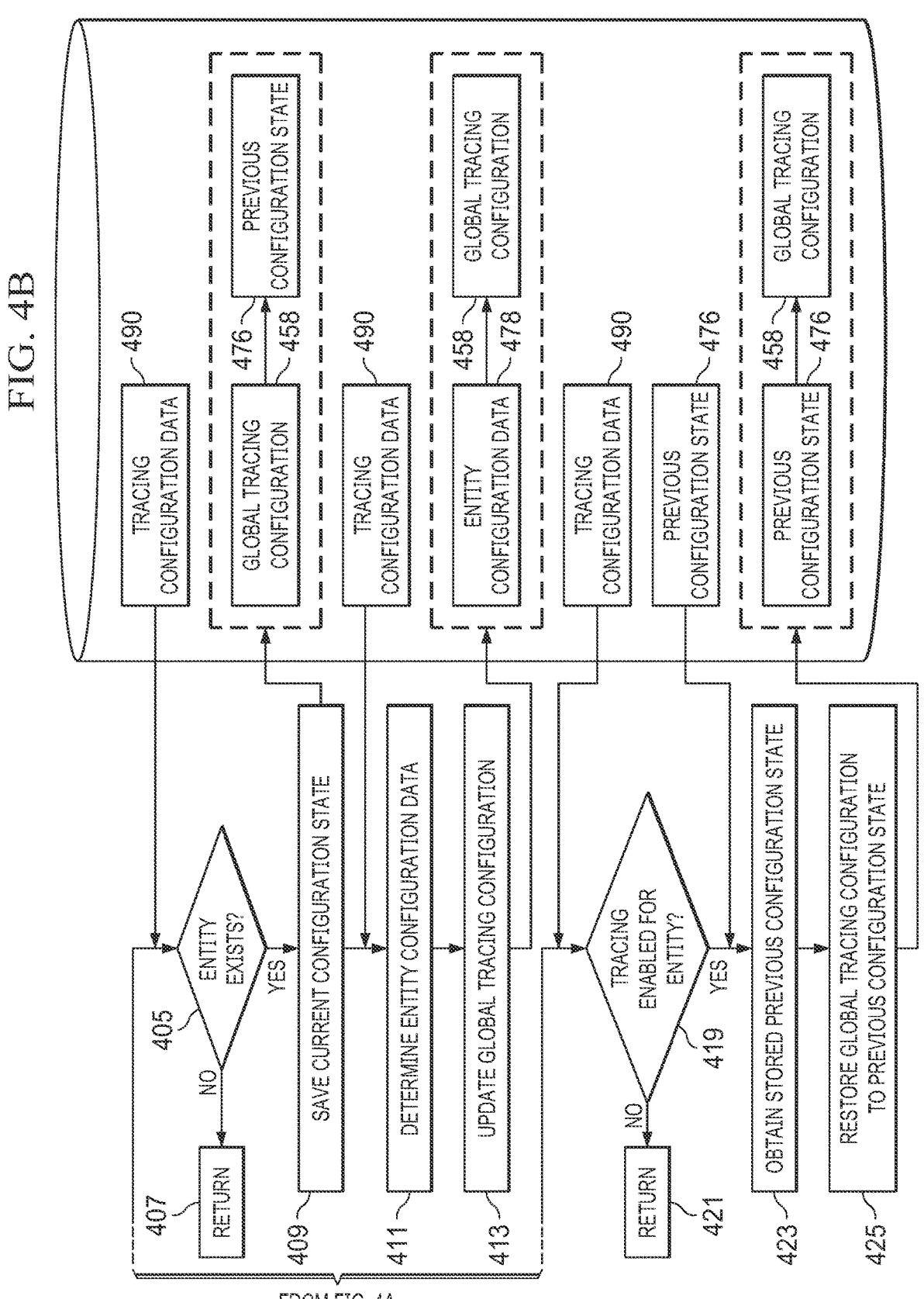

FIGS. 4A and 4B depict a flow diagram of one embodiment of a method for selective tracing of entities using scope context objects for dynamic configuration. A code block 450 may be executed for processing of a specific entity 482. During the execution of the code block 450, when (or after) an entry point of the code block 450 is reached, the code block 450 may instantiate an instance of a scope context object 440 (STEP 401). The instantiation of the scope context object 440 may thus cause a constructor of the scope context object 440 to be invoked on the (e.g., identifier of the) entity 482 being processed by the execution of code block 450. This instance of the scope context object 440 is thus scoped to (e.g., inherits) the same context as the execution of the code block 450.

The constructor of the instance of the scope context object 440 may then call (or cause to be called) a tracing enable module 472 of selective tracing manager 470 with the identifier of the entity being processed (STEP 403). In response to this call, tracing enable module 472 can determine if tracing is enabled for that entity by determining if an entry for that identified entity exists in tracing configuration data 490 (STEP 405).

If the identified entity is not in the tracing configuration data 490 (No branch of STEP 405) no action may be taken (STEP 407). If, however, the entity is included in the tracing configuration data 490 (Yes branch of STEP 405) a current state of the global tracing configuration 458 may be obtained and saved as a (e.g., most recent) previous configuration state 476 (STEP 409). Additionally, entity configuration data may be determined for the identified entity (STEP 411) This entity configuration data 478 may be simply that tracing is to be enabled for the entity (e.g., an entry exists for the entity in the tracing configuration data 490 as determined at STEP 405), or may be more complex, such as an identifier of one or more domains associated with the entity for which tracing should be enabled, or a type or level of tracing that should be enabled for the entity identified by the entity identifier of the entry.

Global tracing configuration 458 can then be configured according to the entity configuration data 478 associated with the entity (e.g., that specifies that tracing should be enabled, that a type or level of tracing that should be enabled for an entity, etc.) (STEP 413). Thus, the global tracing configuration 458 may be configured according to the entity configuration data 478 for the entity such that, for example, tracing for domain associated with the entity is enabled, or a tracing level or tracing facility is enabled in association with the execution of the code block 450 for processing that entity. Accordingly, when the code block 450 is executing for processing the entity 482 the tracing code 452 included in that code block 450 may be executed (or executed in a particular manner) to write events to log file 416.

When an exit point of the code block 450 is reached (or at some point before the code block 450 exits or returns), the destructor of the scope context object 440 is called (STEP 415). The destructor of the scope context object 440 may then call tracing disable module 474 of the selective tracing manager 470 with an identifier of entity 482 (STEP 417). In response to this call, tracing disable module 474 can determine if tracing is enabled for the identified entity 482 (STEP 419). This determination can be made, for example, by accessing the tracing configuration data 490 to determine if there is an entry associated with the identified entity 482.

If tracing is not enabled for the identified entity 482 (e.g., there is no entry for that entity 482 in the tracing configuration data 490 (No branch of STEP 419) no action may be taken (STEP 421). If, however, tracing is enabled for the entity 482 (e.g., there is an entry for the entity 482 in the tracing configuration data 490) (Yes branch of STEP 419), the tracing disable module 474 may obtain a (e.g., most recently stored) previous configuration state 476 (STEP 423), and restore the global tracing configuration 458 to the obtained previous configuration state 476 (STEP 425).

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method, comprising:
storing tracing configuration data, wherein the tracing configuration data identifies an entity including an item, object, or value;
executing a code block to process the entity;
in response to encountering an entry point of the code block in association with the processing of the entity by the code block, wherein the code block comprises tracing code, determining that the tracing configuration data indicates that tracing is enabled for the entity, wherein the entry point is associated with a constructor for an object scoped to the execution of the code block for processing the entity;
in response to determining that tracing is enabled for the entity, configuring a global tracing configuration to enable tracing such that during the execution of the code block for processing the entity, the tracing code of the code block executes; and
in response to encountering an exit point of the code block, restoring a previous state of the global tracing configuration, wherein the exit point is a destructor for the object scoped to the execution of the code block for processing the entity.

2. The method of claim 1, wherein the tracing configuration data identifies entities to be traced by the tracing code, and a first configuration of the global tracing configuration enables tracing by execution of the tracing code and a second configuration of the global tracing configuration disables tracing by preventing execution of the tracing code.

3. The method of claim 2, wherein the previous state of the global tracing configuration disables tracing.

4. The method of claim 1, wherein the tracing configuration data comprises an entity tracing configuration for the entity and the global tracing configuration is configured according to the entity tracing configuration for the entity.

5. The method of claim 4, wherein the entity tracing configuration specifies a tracing level or a tracing facility.

6. The method of claim 4, wherein the code block is adapted to perform processing associated with a domain and the entity tracing configuration is associated with the domain.

7. The method of claim 6, wherein the configuration of the global tracing configuration is specific to the domain.

8. The method of claim 7, wherein the domain comprises routes, forwarding equivalency classes or network adjacencies.

9. The method of claim 1, further comprising, in response to determining that tracing is enabled for the entity, storing a current state of the global tracing configuration as the previous state of the global tracing configuration before configuring the global tracing configuration according to the enabled tracing for the entity.

10. The method of claim 9, wherein the previous state of the global tracing configuration is stored as a most recent previous state of a set of global states.

11. The method of claim 10, wherein restoring the previous state of the global tracing configuration comprises identifying the most recently stored previous state and restoring the most recently stored previous state.

12. A device, comprising:
a non-transitory computer readable medium storing a code block and a selective trace manager; and
a processor executing the code block and the selective trace manager,
the code block comprising instructions including:
tracing code;
entry point code adapted to call the selective trace manager to enable tracing with an identifier for an entity being processed by the code block, the entity including an item, object, or value, wherein the entry point code is a constructor for an object scoped to an execution of the code block for processing the entity; and
exit point code adapted to call the selective trace manager to disable tracing with the identifier for the entity being processed by the code block, wherein the exit point code is a destructor for the object scoped to the execution of the code block for processing the entity; and
the selective trace manager comprising instructions for:
in response to the call to enable tracing:
accessing tracing configuration data comprising the entity to determine that the tracing configuration data indicates that tracing is enabled for the entity; and
in response to determining that tracing is enabled for the entity, configuring a global tracing configuration to enable tracing such that during execution of the processing of the entity by the code block the tracing code of the code block executes; and
in response to the call to disable tracing, restoring a previous state of the global tracing configuration.

13. A non-transitory computer readable medium storing code block, and comprising instructions for:
maintaining tracing configuration data, wherein the tracing configuration data comprises an entity including an item, object, or value;
causing a processor to execute the code block; and
during the execution of the code block:

after an entry point of the code block in association with processing of a first entity by the code block at a first time, wherein the code block comprises tracing code, determining that the tracing configuration data indicates that tracing is enabled for the first entity;

in response to determining that tracing is enabled for the first entity, configuring a global tracing configuration to enable tracing such that during the execution of the code block for processing the first entity, the tracing code of the code block executes, wherein the code block comprises code for instantiating an object after the entry point, wherein the object is scoped to the execution of the code block for processing the first entity and wherein the determination that the tracing configuration data indicates that tracing is enabled for the first entity and the configuring of the global tracing configuration to enable tracing is done in response to the instantiation of the object, or in response to association of the object with a defined scope; and before an exit point of the code block, restoring a previous state of the global tracing configuration.

14. The non-transitory computer readable medium of claim 13, wherein the instructions are further for:

in response to encountering the entry point of the code block in association with processing of a second entity by the code block at a second time, determining that the tracing configuration data indicates that tracing is not enabled for the second entity; and in response to determining that tracing is not enabled for the second entity, executing the code block for processing the second entity according to the global tracing configuration.

15. The non-transitory computer readable medium of claim 14, wherein the previous state of the global tracing configuration disables tracing such that during the execution of the code block for processing the second entity the tracing code of the code block does not execute.

16. The non-transitory computer readable medium of claim 15, wherein the second time is subsequent to the first time.

17. The non-transitory computer readable medium of claim 13, wherein the determination that the tracing configuration data indicates that tracing is enabled for the first entity and the configuring of the global tracing configuration to enable tracing is initiated by a constructor of the object or a scope-entry function.

18. The non-transitory computer readable medium of claim 13, wherein the code block comprises code for calling a destructor of the object or a scope-exit function associated with the object before the exit point and the restoring the previous state of the global tracing configuration is initiated by the destructor or scope-exit function associated with the object.

* * * * *